United States Patent
Xie et al.

(10) Patent No.: US 10,091,644 B2
(45) Date of Patent: Oct. 2, 2018

(54) SYSTEM AND METHOD FOR IMPLEMENTING CAPABILITY EXPOSURE, AND CAPABILITY EXPOSURE PLATFORM

(71) Applicant: ZTE Corporation, Shenzhen (CN)

(72) Inventors: Baoguo Xie, Shenzhen (CN); Zhijun Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/511,355

(22) PCT Filed: Apr. 10, 2015

(86) PCT No.: PCT/CN2015/076310
§ 371 (c)(1),
(2) Date: Mar. 15, 2017

(87) PCT Pub. No.: WO2016/041344
PCT Pub. Date: Mar. 24, 2016

(65) Prior Publication Data
US 2017/0265063 A1 Sep. 14, 2017

(30) Foreign Application Priority Data
Sep. 15, 2014 (CN) .......................... 2014 1 0468605

(51) Int. Cl.
*H04M 3/00* (2006.01)
*H04W 8/22* (2009.01)
(52) U.S. Cl.
CPC .................................. *H04W 8/22* (2013.01)
(58) Field of Classification Search
CPC . H04L 65/1016; H04L 65/1073; H04L 67/24; H04L 65/1006; H04L 12/24;
(Continued)

(56) References Cited

U.S. PATENT DOCUMENTS 9,654,357 B2 * 5/2017 Fox ..................... H04L 41/5025
9,769,750 B2 * 9/2017 Jheng ................ H04W 52/0212
(Continued)

FOREIGN PATENT DOCUMENTS

CN 102624926 A 8/2012
CN 103392353 A 11/2013
(Continued)

OTHER PUBLICATIONS

International Search Report for corresponding application PCT/CN2015/076310 filed on Apr. 10, 2015; dated Apr. 17, 2015.

*Primary Examiner* — Mahendra Patel
(74) *Attorney, Agent, or Firm* — Cantor Colburn LLP

(57) ABSTRACT

A system and method for implementing capability exposure and a Capability Exposure Platform (CEP) are provided. the method includes: the CEP receive a user capability updating service request of User Equipment (UE), and determines whether to initiate network capability updating service for a user or not according to subscription information of the user and current network capability information; a corresponding user capability updating parameter is generated after determining to initiate the network capability updating service for the user; and a user capability updating request is sent to a Capability Schedule Entity (CSE), the generated user capability updating parameter being carried therein, to cause the CSE to schedule a network resource to meet a network capability requirement of the user according to the user capability updating parameter.

18 Claims, 6 Drawing Sheets

(58) Field of Classification Search
CPC ..... H04L 67/02; H04L 63/02; H04L 63/1433; H04W 12/06; H04W 8/00; H04W 28/10; H04W 8/22; H04W 48/02; H04W 28/0236; H04W 40/12; H04W 48/06; H04W 76/02; H04W 76/12; H04W 40/02; H04M 3/42374; H04N 7/147; G06F 11/00; G06Q 20/04; G06Q 20/32; G06Q 20/322; G06Q 20/327; G06Q 20/3672
USPC ...... 455/419, 158.5, 186.1, 1; 703/23; 726/2
See application file for complete search history.

(56) References Cited

U.S. PATENT DOCUMENTS

| | | | | |
|---|---|---|---|---|
| 2003/0033179 | A1* | 2/2003 | Katz | G06Q 10/063 705/7.12 |
| 2006/0261153 | A1* | 11/2006 | McLoughlin | G06Q 20/32 235/379 |
| 2007/0192867 | A1* | 8/2007 | Miliefsky | H04L 63/20 726/25 |
| 2009/0077258 | A1* | 3/2009 | Dowling | G06Q 20/04 709/237 |
| 2009/0210532 | A1* | 8/2009 | Lim | H04L 12/2805 709/226 |
| 2010/0235433 | A1* | 9/2010 | Ansari | G06Q 30/04 709/203 |
| 2011/0032898 | A1* | 2/2011 | Kazmi | H04W 28/06 370/329 |
| 2011/0235546 | A1* | 9/2011 | Horn | H04L 12/66 370/254 |
| 2012/0039213 | A1* | 2/2012 | Cheng | H04W 76/12 370/254 |
| 2012/0088540 | A1* | 4/2012 | Smith | H04L 67/303 455/550.1 |
| 2012/0214444 | A1* | 8/2012 | McBride | H04L 63/0807 455/411 |
| 2012/0225652 | A1* | 9/2012 | Martinez | H04M 3/42374 455/435.1 |
| 2012/0284775 | A1* | 11/2012 | Betti | H04L 67/16 726/3 |
| 2013/0019291 | A1* | 1/2013 | Zou | H04L 63/08 726/6 |
| 2014/0242994 | A1* | 8/2014 | Xu | H04W 36/14 455/436 |
| 2015/0304939 | A1* | 10/2015 | Liu | H04W 8/22 370/232 |
| 2016/0078342 | A1* | 3/2016 | Tang | H04L 41/00 706/47 |
| 2016/0374139 | A1* | 12/2016 | Chen | H04W 76/043 |

FOREIGN PATENT DOCUMENTS

| | | | | |
|---|---|---|---|---|
| CN | 103702352 A | | 4/2014 | |
| CN | 101765102 B | * | 7/2014 | |
| EP | 1705869 A1 | | 9/2006 | |
| EP | 3065374 A4 | * | 11/2016 | ............ H04L 67/02 |
| WO | WO 2008012659 A2 | * | 1/2008 | ............ H04W 28/24 |
| WO | WO 2008013554 A1 | * | 1/2008 | ............ H04L 12/66 |
| WO | WO 2014101228 A1 | * | 7/2014 | ............ H04W 8/22 |

* cited by examiner

SYSTEM AND METHOD FOR IMPLEMENTING CAPABILITY EXPOSURE, AND CAPABILITY EXPOSURE PLATFORM

TECHNICAL FIELD

The present disclosure relates to a mobile data network technology, and more particularly to a system and method for implementing capability exposure and a Capability Exposure Platform (CEP).

BACKGROUND

Rapid development of the mobile communication technology brings huge influence on lifestyles and work of people, as well as each aspect of politics, economy of the society. The human society enters an efficient information age, and service application requirements of each aspect explosively grow, which brings huge challenges to each aspect of frequency, technology, operation and the like of a future mobile communication bandwidth system.

Along with enrichment of various Internet applications, a third-party service provider has increasing information interaction and network personality requirements on a network operating company, and network capability exposure gradually becomes a mainstream of a future network technology. At present, a part of mobile services used by mobile personal users, industry users and Service Providers/Content Providers (SPs/CPs) are delay-insensitive, such as software update, software download, music download and video download, but data traffics of these services are slightly high, and transmission with a normal data plan may cost too much.

In the existing network, a mobile data network presents a characteristic of obvious imbalance of busy-idle in terms of time and region, which causes existence of many idle wireless resources in the network. A background traffic service may fully utilize these idle wireless resources to make the network of the operating company fully utilized. On one aspect, for the users, the traffic is cheaper. Moreover, for the SP/CP, a low-cost background traffic channel may also be utilized to distribute the services and content, thereby promoting the user to use mobile traffic, which in turn bring data service income growth to the operating company, wherein the background traffic refers to the autonomous exchange of a user plane data packet between the User Equipment (UE) and the network, which is usually generated in absence of a specific user interaction of the device.

In the mobile Internet era, network capability exposure of operating companies has become a general trend. For many years, channel resources and network advantages are always core competitiveness of the operating companies. However, along with the coming of 4th-Generation (4G) and 5th-Generation (5G) eras, plenty of Internet applications gradually make the operating companies become pure pipe providers. Therefore, constructing a unified and exposed capability platform to reasonably expose capabilities of basic services, information and the like becomes a key for future competitiveness construction of the operating companies.

SUMMARY

The present disclosure provides a system and method for implementing capability exposure and a CEP, which may expose a network capability to a user and ensure the user to smoothly use service, thereby improving quality of user experiences.

A system for implementing capability exposure may include: a Mobility Control Plane Entity (MCP), a Mobility User Plane Entity (MUP), a Policy and Charging Rule Function (PCRF), an Application Server (APP), a Capability Schedule Entity (CSE) and a CEP, wherein the CEP may be configured to receive a user capability updating service request from UE via a user capability interface of the CEP, or, receive the user capability updating service request from the UE via the CSE; and the CEP may further be configured to provide network capability updating service for the UE.

Preferably, the CEP may be configured to receive the user capability updating service request for updating a network capability from the UE, determine whether to initiate the network capability updating service for a user or not according to subscription information of the user and current network capability information, generate a corresponding user capability updating parameter after determining to initiate the network capability updating service for the user, and send a user capability updating request to the CSE, the generated user capability updating parameter being carried therein;

the CSE may further be configured to schedule a network resource to meet a network capability requirement of the user according to the obtained user capability updating parameter, and return an acknowledgement response to the CEP when the current network resource meets the capability updating requirement of the user; and the PCRF may be configured to update a Policy Control and Charging (PCC) policy and user priority of the user according to the user capability updating parameter, and transmit them to the MCP and the MUP for execution.

Preferably, the CEP may further be configured to return a user capability updating success notice to the UE, or return the user capability updating success notice to the UE via the CSE.

Preferably, the CSE may further be configured to return a denial response to the CEP when the current network resource may not meet the capability updating requirement of the user, and carry a denial cause.

Preferably, the CEP may further be configured to return a update denial response to the UE, or regenerate a user capability updating parameter and reinitiate a user capability updating request to the CSE, the regenerated user capability updating parameter being carried therein.

Preferably, the UE may be UE including a single user, or may be a UE group including two or more than two users.

A method for implementing capability exposure may include that: a CEP acquires a user capability updating service request of UE, and determines whether to initiate network capability updating service for a user or not according to subscription information of the user and current network capability information;

a corresponding user capability updating parameter is generated after determining to initiate the network capability updating service for the user; and a user capability updating request is sent to a CSE, the generated user capability updating parameter being carried therein, to cause the CSE to schedule a network resource to meet a network capability requirement of the user according to the user capability updating parameter.

Preferably, the user capability updating service request may carry a user Identity (ID) or a user group ID and a service ID of service requested to be updated.

Preferably, the user capability updating service request may further carry a parameter of the service requested to be updated, or a type of an emergency and an emergency message of the user, or a user list in a user group and application area information.

Preferably, a basis for determining whether to initiate the network capability updating service for the user or not may include that:

the subscription information of the user indicates a right over network capability updating and the current network capability information indicates that the current network resource meets the network capability updating requirement of the request.

Preferably, the current network capability information may be current network capability information, obtained from the CSE, of a network; and the subscription information of the user may include network subscription information, obtained from a network side, of the user, and/or service subscription information, obtained from an application side, of the user, and/or own configured capability subscription information of the user.

Preferably, the operation that the user capability updating parameter is generated may include that: the CEP generates an updated Quality of Service (QoS) parameter or user priority parameter according to a user QoS parameter or priority parameter obtained from a service server and allowed by a service, and/or current network resource information and network congestion degree information obtained from the network side and/or user capability subscription information configured by the CEP, and generates the user capability updating parameter according to a preset configuration policy.

Preferably, the user capability updating parameter may include one or more of: a QoS parameter, or a user priority, or a bandwidth parameter, or a delay parameter, or a charging policy or a requested time length.

Preferably, the operation that the network resource is scheduled to meet the network capability requirement of the user according to the user capability updating parameter may include that:

the CSE matches the user capability updating parameter according to the current network resource, and if the current network resource meets a requirement presented by the user capability updating parameter, initiates a user policy updating request to a PCRF, parameter information of the service requested to be updated being carried in the request.

Preferably, the method may further include that: the PCRF updates a PCC policy and user priority of the user according to the user capability updating parameter, and transmits them to an MCP and an MUP for execution.

Preferably, the method may further include that: when the current network resource is insufficient, the CEP regenerates a user capability updating parameter; and the CSE schedules a network resource to meet the network capability requirement of the user according to the regenerated user capability updating parameter.

A CEP may include a receiving module, an acquisition module, a processing module and a sending module, wherein the receiving module may be configured to receive a user capability updating service request, determine whether to initiate network capability updating service for a user or not according to subscription information of the user and current network capability information from the acquisition module, and notify the processing module when determining to initiate;

the processing module may be configured to receive a notice from the receiving module, generate a corresponding user capability updating parameter according to the subscription information of the user from the acquisition module and service and network resource parameters, and output the generated user capability updating parameter to the sending module;

the acquisition module may be configured to acquire the subscription information of the user and the service and network resource parameters; and the sending module may be configured to send a user capability updating request to a CSE, the generated user capability updating parameter being carried therein.

The sending module may further be configured to:

when an acknowledgement response is received from the CSE through the receiving module, send a an update success response to UE; and when a denial response is received from the CSE through the receiving module, send a update denial response to the UE, or send a reprocessing notice to the processing module.

The processing module may further be configured to receive the reprocessing notice, regenerate a user capability updating parameter, and reinitiate a user capability updating request to the CSE through the sending module, the regenerated user capability updating parameter being carried therein.

A computer-readable storage medium may store a computer-executable instruction, the computer-executable instruction being configured to execute any abovementioned method.

Compared with a related technology, the technical solutions of the present disclosure include that the CEP acquires that the UE requests for updating a network capability, determines whether to initiate the network capability updating service for the user or not according to the subscription information of the user and the current network capability information, and generates the corresponding user capability updating parameter after determining to initiate the network capability updating service for the user; and the CSE schedules the network resource to meet the network capability requirement of the user according to the user capability updating parameter. According to embodiments of the present disclosure, the network capability is updated according to the request from the user, exposure of the network capability in a capability exposure network to the user is implemented, and the user is ensured to smoothly use the service, so that quality of user experiences is improved.

DETAILED DESCRIPTION OF THE EMBODIMENTS

Figure 1:
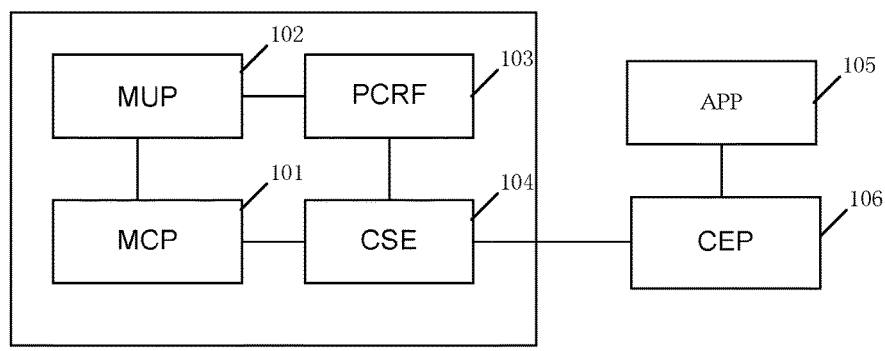
FIG. 1 is a schematic diagram of network architecture for implementing capability exposure according to the related technology.

FIG. 1 is a schematic diagram of network architecture for implementing capability exposure according to the related technology. As shown in FIG. 1, the capability exposure network architecture of the related technology includes:

an MCP 101, configured for control plane mobility management, including, but not limited to: user context and mobility state management, user temporary ID allocation and the like;

an MUP 102, which is a user plane entity and is configured for user plane data routing processing and an external gateway function;

a PCRF 103, configured for policy control determination and flow charging control functions;

a CSE 104, configured to schedule a network resource according to an external capability requirement, or, expose network service of network related information and the like according to the external capability requirement;

a CEP 106, configured to request a network for the network resource and information to provide better service for a user according to a requirement of a third party; and an APP 105, configured to provide, by the third party, rich and diversified Internet service for the user.

By adopting the capability exposure network architecture of the related technology shown in FIG. 1, a mobile network externally exposes mobile network information and exposes a mobile network capability in a unified manner through a service exposure platform, and an exposure object includes a third-party application, own application of an operating company and the like.

Figure 2:
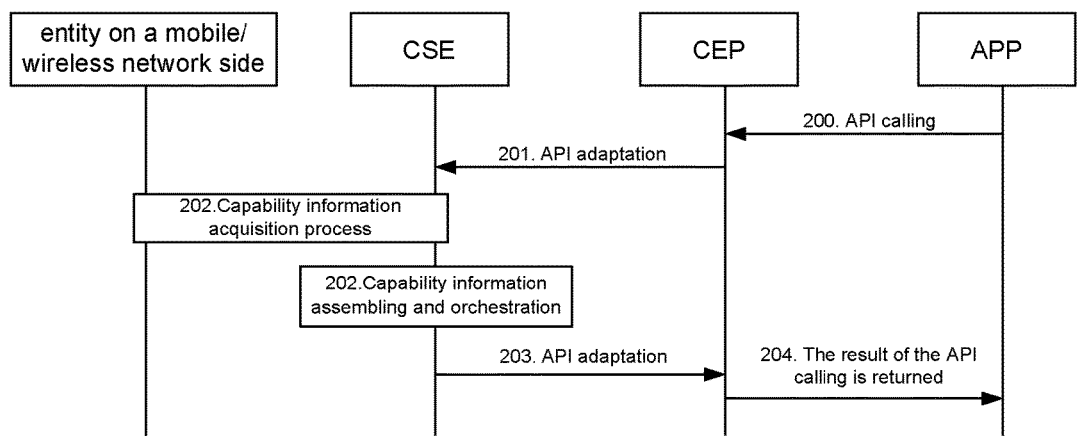
FIG. 2 is a flowchart of implementing capability exposure according to the related technology.

FIG. 2 is a flowchart of implementing capability exposure according to the related technology. As shown in FIG. 2, the following steps are included.

Step 200: an APP calls an Application Protocol Interface (API) from a CEP according to own service flow requirement, for example, an area position user density API in a user trajectory application scenario is called.

Step 201: the CEP analyzes that capability information is required to be acquired from a mobile network from the called API, sends an application which is adapted to the API to a CSE, and indicates the network capability information required to be acquired, such as user density information of a geographical area.

Step 202: the CSE determines to acquire the corresponding network capability information from a target entity of the mobile network, for example, a user number of one or more cells according to the area position user density API is determined, and initiates a capability information acquisition process to the corresponding entity on a mobile/wireless network side.

Step 203: the CSE assembles or orchestrates the obtained capability information to form an adaptation result of API calling according to a requirement of the API, for example, a current user number of the cell is assembled into user density information of the specific area position.

Step 204~Step 205: the CSE returns the adaptation result of the API to the APP through the CEP.

From the method for implementing capability exposure in the related technology, it can be seen that the capability exposure network architecture of the related technology only exposes the network capability to a third-party application, and the third-party application may request for service of QoS parameter updating, charging policy regulation (such as a service paid by a third party for a user), user preference information acquisition and the like through the CEP. That is, the user may not request for regulating a network capability in real time through UE. Along with coming of the 4G and even 5G era, the user may not implement real-time requesting for changing a related network capability such as a QoS parameter and a user priority through a capability exposure network when executing a characteristic service such as a video service or an emergency service, which may disable the user to smoothly use the service or emergency service, thereby cause reduction in quality of user experiences.

Figure 3:
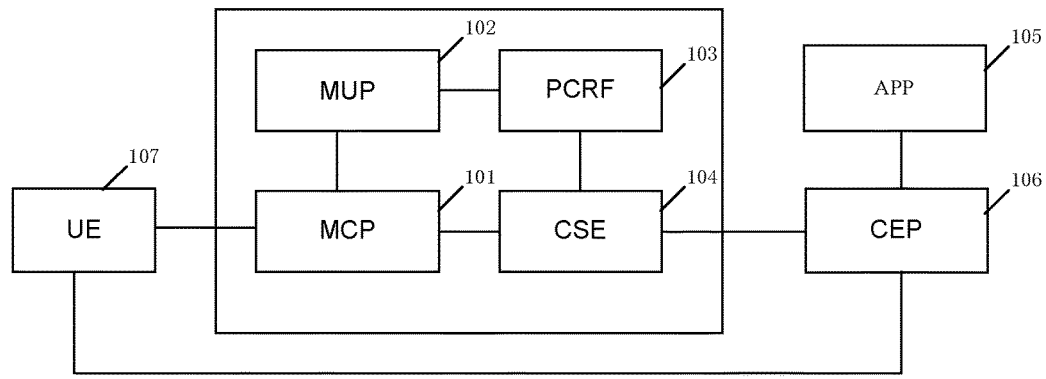
FIG. 3 is a schematic diagram of a system for implementing capability exposure according to an embodiment of the present disclosure.

FIG. 3 is a schematic diagram of a system for implementing capability exposure according to an embodiment of the present disclosure. As shown in FIG. 3, the system includes: an MCP 101, an MUP 102, a PCRF 103, a CSE 104, an APP 105 and a CEP 106, wherein the MCP 101, MUP 102, PCRF 103, CSE 104, APP 105 and CEP 106 shown in FIG. 3 are compatible with functions in the network architecture for implementing capability exposure in the related technology shown in FIG. 1. In addition, the CEP 106 additionally processes a requirement of a user, and the CEP 106 may obtain related information of the user, such as subscription information, capability subscription information of the user, a network right and service right of the user and service authorization of the user, and may judge whether to provide network capability service for the user or not. The CEP 106 may statically configure the capability subscription information of the user, and may also apply a network and a third-party for the subscription information of the user and network right and service right information of the user.

As shown in FIG. 3, in a network architecture for implementing capability exposure in the embodiment of the present disclosure, a user capability interface is arranged between UE 107 and the CEP 106, or, the UE 107 is connected with the CEP 106 via the CSE 104.

The CEP 106 is configured to receive a user capability updating service request (which may also be called as a network capability updating request) from the UE 107 via a user capability interface of the CEP, or, receive the user capability updating service request from the UE 107 via the CSE 104; and the CEP 106 is further configured to provide the network capability updating service for the UE 107.

An interface between the CSE 104 and the CEP 106 is an existing interface, but is not exposed to the UE 107, and may be called as a southbound interface.

The CEP 106 is configured to, after receiving the user capability updating service request for updating a network capability from the UE 107, determine whether to initiate the network capability updating service for the user or not according to subscription information of the user and current network capability information, and generate a corresponding user capability updating parameter after determining to initiate the network capability updating service for the user.

Here, the subscription information of the user includes: network subscription information, acquired from a network side by the CEP 106, of the user, service subscription information, acquired from an application side by the CEP 106, of the user, and capability subscription information, configured by the CEP 106, of the user.

The CEP 106 determines whether to initiate the network capability updating service for the user or not, and a decision making policy includes, but not limited to: according to current network capability information, obtained from the CSE 104, of the network, and the network subscription information, obtained from the network side, of the user, and/or the service subscription information, obtained from the application side, of the user, and/or own configured capability subscription information of the user.

Here, generation of the user capability updating parameter includes generation of an updated QoS parameter or user priority parameter. A parameter determination policy includes, but not limited to: a QoS parameter or user priority parameter obtained from a service server and allowed by a service, and/or current network resource information and network congestion degree information obtained from the network side, and/or user capability subscription information configured by the CEP.

Preferably, if determining to initiate the network capability updating service for the user, the CEP 106 sends a user capability updating request (which may also be called as a user capability updating request) to the CSE 104, the generated user capability updating parameter being carried therein, wherein the user capability updating parameter includes a corresponding parameter such as a bandwidth, a delay, charging and a time length.

The CSE 104 is further configured to schedule a network resource to meet a network capability requirement of the user according to the user capability updating parameter, return an acknowledgement response to the CEP 106 when the current network resource meets the capability updating requirement of the user, and notify the PCRF to change a PCC policy and user priority of the user.

Correspondingly, the CEP 106 is further configured to return a user capability updating success notice to the UE 107 or to the UE 107 via the CSE 104.

The PCRF 103 is further configured to update the PCC policy and user priority of the user according to the user capability updating parameter, and transmit them to the MCP 101 and the MUP 102 for execution. Preferably, the CSE 104 is further configured to return a denial response to the CEP 106 when the current network resource may not meet the capability updating requirement of the user, and carry a denial cause such as network resource insufficiency.

Preferably, the CEP 106 is further configured to return a update denial response to the UE 107, or regenerate a user capability updating parameter and reinitiate a user capability updating request to the CSE, the regenerated user capability updating parameter being carried therein.

Wherein, the UE 107 is UE including a single user, or is a UE group including two or more than two users.

The system for implementing capability exposure according to the embodiment of the present disclosure updates the network capability according to the request from the user to implement exposure of the network capability in a capability exposure network to the user and ensure the user to smoothly use the service, thereby improving quality of user experiences. Particularly, when the user executes a characteristic service such as a video service or an emergency service, real-time requesting for changing the related network capability such as the QoS parameter and the user priority is implemented through the capability exposure network, and the user is ensured to smoothly use the service or emergency service.

Figure 4:
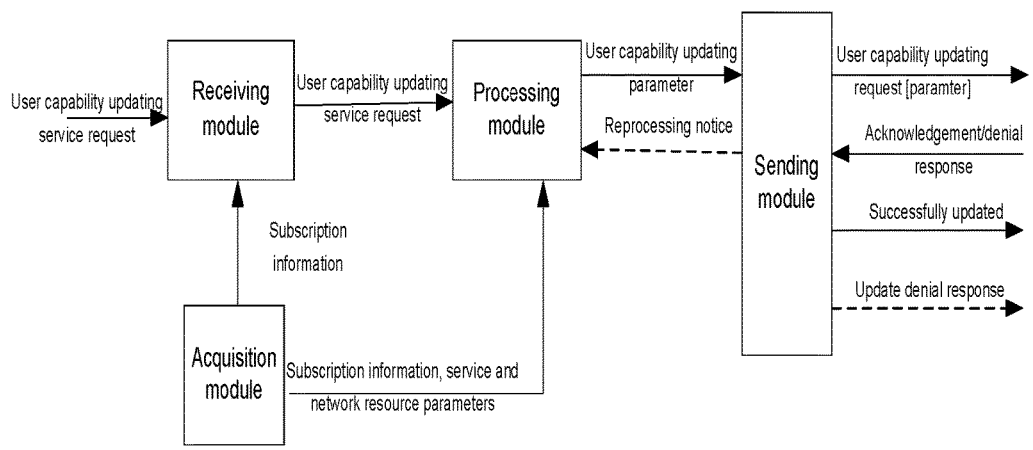
FIG. 4 is a structure diagram of a CEP according to an embodiment of the present disclosure.

FIG. 4 is a structure diagram of a CEP according to an embodiment of the present disclosure. As shown in FIG. 4, the CEP includes: a receiving module 401, an acquisition module 402, a processing module 403 and a sending module 404, wherein the receiving module 401 is configured to receive a user capability updating service request, determine whether to initiate network capability updating service for a user or not according to subscription information of the user from the acquisition module, and notify the processing module 403 when determining to initiate.

Here, the user capability updating service request may be from UE, and may also be forwarded through a CSE. When there are two or more than two users, the user capability updating service request is from a user agent.

The processing module 403 is configured to receive a notice from the receiving module 401, generate a corresponding user capability updating parameter according to the subscription information of the user from the acquisition module 402 and service and network resource parameters, and output the generated user capability updating parameter to the sending module 404.

The acquisition module 402 is configured to acquire the subscription information of the user and the service and network resource parameters.

The sending module 404 is configured to send a user capability updating request to a CSE, the generated user capability updating parameter being carried therein.

The sending module 404 is further configured to: when an acknowledgement response is received from the CSE through the receiving module 401, send a an update success response to UE; and when a denial response is received from the CSE through the receiving module 401, send a update denial response to the UE, or send a reprocessing notice to the processing module 403.

In addition, the processing module 403 is further configured to regenerate a user capability updating parameter, and reinitiate a user capability updating request to the CSE through the sending module 404, the regenerated user capability updating parameter being carried therein.

Figure 5:
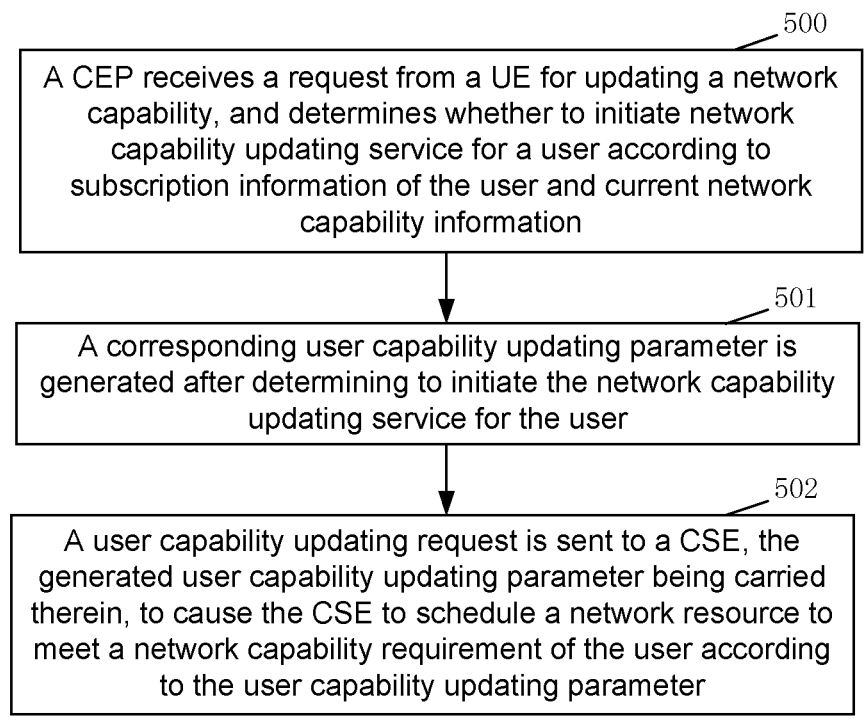
FIG. 5 is a flowchart of a method for implementing capability exposure according to an embodiment of the present disclosure.

FIG. 5 is a flowchart of a method for implementing capability exposure according to an embodiment of the present disclosure. As shown in FIG. 5, the method includes the following steps.

Step 500: a CEP acquires that UE requests for updating a network capability, and determines whether to initiate network capability updating service for a user or not according to subscription information of the user and current network capability information.

In the step, the UE may initiate a user capability updating service request to the CEP through a user capability interface or through a CSE, a user ID or a user group ID and a service ID of service requested to be updated, such as a service ID indicating a QoS parameter improvement requirement, being carried therein.

Preferably, the user capability updating service request may further carry a parameter of the service requested to be updated, such as a QoS parameter indication required to be improved or an expected parameter value such as a bandwidth parameter and a delay parameter, and a requested time length.

Preferably, for an emergency, the user capability updating service request may further carry an emergency type, and may also carry an emergency message of the user.

Preferably, a user capability updating service request of a user group including multiple users may further carry a user list in the user group and application area information.

In the step, the current network capability information is current network capability information, obtained from the CSE, of a network; and the subscription information of the user includes network subscription information, obtained from a network side, of the user, and/or service subscription information, obtained from an application side, of the user, and/or own configured capability subscription information of the user.

In the step, a basis for determining whether to initiate the network capability updating service for the user or not includes that:

one of the subscription information of the user indicates a right over network capability updating and the current network capability information indicates that a current network resource meets a network capability updating requirement of the request.

That is, determining whether to initiate the network capability updating service for the user is determined by two factors. One is a subscription factor, that is, whether the user has the right for network capability updating or not, which may be determined by one of a network right, a service right and a capability right, and there is usually no conflict among the three. The other is a network resource factor, that is, whether the current network resource may meet the network capability updating requirement of the user or not. If one of the factors may not meet the requirement, the network capability updating service for the user may not be initiated. That is, the network capability updating service for the user may be determined as long as the subscription factor and the network resource factor both meet the requirement.

Wherein, the subscription information of the user includes the network subscription information, obtained from the network side by the CEP, of the user, the service subscription information, obtained from the application side by the CEP, of the user, and the capability subscription information, configured by the CEP, of the user.

Step 501: a corresponding user capability updating parameter is generated after determining to initiate the network capability updating service for the user.

In the step, the user capability updating parameter is generated, including generation of an updated QoS parameter or user priority parameter. A parameter determination policy includes, but not limited to: a QoS parameter or user priority parameter obtained from a service server and allowed by a service, and/or current network resource information and network congestion degree information obtained from the network side, and/or user capability subscription information configured by the CEP. The user capability updating parameter is generated according to a preset configuration policy. Here, it is only an example for description, and generation of the user capability updating parameter is implemented according to a static capability operation configuration policy, and may namely be generated according to a user capability updating parameter generation rule statically preconfigured in the CEP.

Wherein, the user capability updating parameter includes, but not limited to, one of: a QoS parameter, or a user priority, or a bandwidth parameter, or a delay parameter, or a charging policy or a requested time length.

Step 502: a user capability updating request is sent to a CSE, the generated user capability updating parameter being carried therein, to cause the CSE to schedule a network resource to meet a network capability requirement of the user according to the user capability updating parameter.

The step includes that:

the CEP sends the user capability updating request to the CSE, the generated user capability updating parameter being carried therein. The user capability updating parameter includes a corresponding parameter such as a bandwidth, a delay, charging and a time length.

The CSE schedules the network resource to meet the network capability requirement of the user according to the user capability updating parameter. The CSE matches the user capability updating parameter (which is also called as a user capability updating parameter) according to the current network resource, and if the current network resource meets the capability updating requirement of the user, initiates a user policy updating request to a PCRF, parameter information of the service requested to be updated being carried in the request, such as information of the QoS parameter, the charging parameter, the application time length, the user ID and the service ID.

The method of the embodiment of the present disclosure further includes that: the PCRF updates a PCC policy and user priority of the user according to the user capability updating parameter, and transmits them to an MCP and an MUP for execution.

When the current network resource is insufficient, the method of the embodiment of the present disclosure further includes that: the CEP regenerates a user capability updating parameter; and the CSE schedules a network resource to meet the network capability requirement of the user according to the regenerated user capability updating parameter.

A difference with a network capability exposure technology of the related technology is that a network for implementing capability exposure provided by the embodiment of the present disclosure provides capability exposure to the user and meets a dynamic network resource and network information requirement of the user in real time. For example, the user wants to improve a network bandwidth due to an excessively low network rate in a process of executing a service, for example, opening a video or a web page with a picture. For another example, a network transmission capability is reduced in an area such as a gymnasium because of holding of a sports event, and at this moment, if building monitoring equipment is required to improve a service priority or a sports event organizer is required to improve QoS, an application may be made in a manner of user group in the area in a unified manner. For another example, in case of an emergency such as a traffic accident in an expressway section or an earthquake in a region, if a user requires a service of uploading a picture or a video, keeping communication with relatives and friends and the like, preferred processing is provided for the user in the emergency.

Detailed descriptions will be made below with reference to embodiments.

Figure 6:
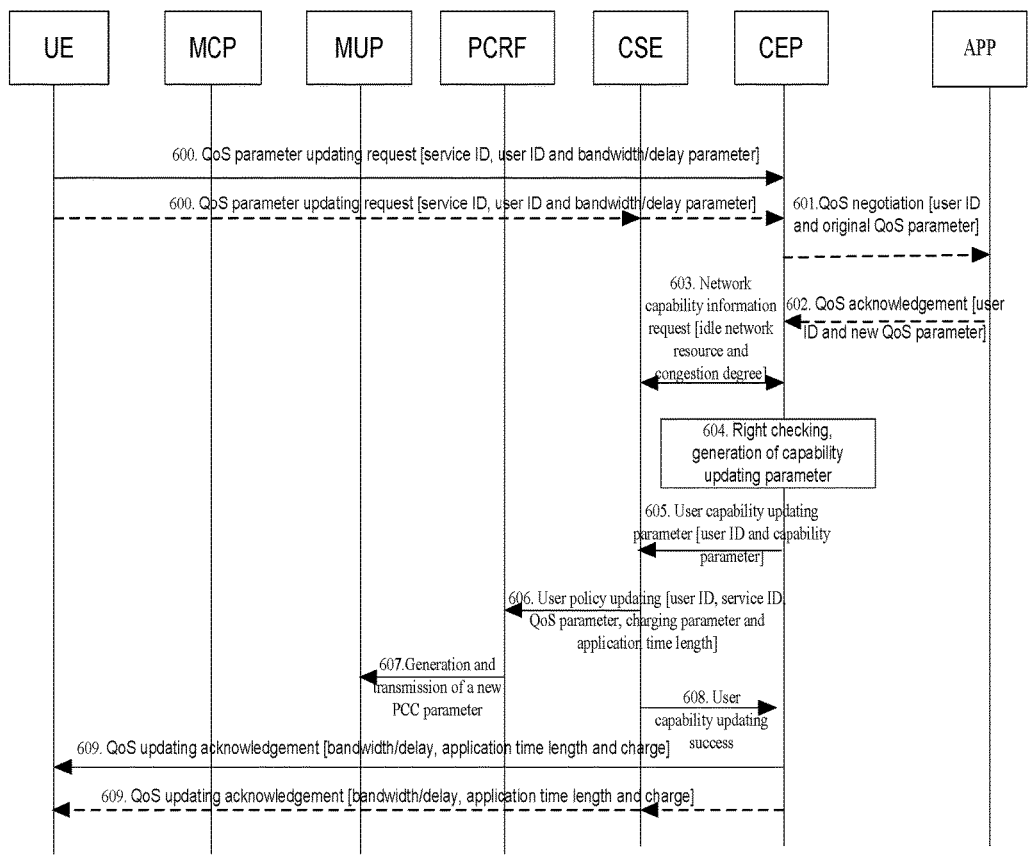
FIG. 6 is a flowchart of a first embodiment of implementing capability exposure according to an embodiment of the present disclosure.

FIG. 6 is a flowchart of a first embodiment of implementing capability exposure according to an embodiment of the present disclosure. As shown in FIG. 6, in the first embodiment, it is supposed that a user wants to watch a video in a webpage when browsing the webpage during execution of a service, but fewer network resources are allocated to a Hyper Text Transport Protocol (HTTP) service of the user, and a bandwidth and a delay may both not meet a watching requirement, so that the user may not smoothly watch the video, and user experiences are very poor. At this moment, the user requests a CEP for updating a network capability through a user capability interface with the CEP, including the following steps.

Step 600: a user initiates a QoS parameter updating request to a CEP through UE, a user ID, a service ID with a QoS parameter improvement requirement and a requested time length being carried therein, a QoS parameter indication required to be improved or an expected parameter value, such as a bandwidth parameter and a delay parameter, being further carried in the embodiment.

If no interface is defined between the user and the CEP, the user may send the QoS parameter updating request to a CSE, and the CSE forwards it to the CEP, as shown in Step 600 represented by a dotted arrowhead in FIG. 6.

Step 601: after receiving the QoS parameter updating request of the user, the CEP initiates the QoS parameter updating request carrying the user ID and the parameter indication of a QoS parameter or a reference value, i.e. the original QoS parameter, to a corresponding service server for QoS negotiation according to the service ID carried therein.

Step 602: after receiving the QoS parameter updating request of the user, the service server determines a new QoS parameter allowed by the user currently initiating the QoS parameter updating request, such as an allowed data transmission bandwidth and delay parameter, according to a service priority of the user, a current processing capability of the service server, a data interface of the service server and a data flow processing congestion degree, and returns it to the CEP.

Step 603: the CEP initiates a network capability information request to the CSE, an idle condition of a requested network resource such as a bearer resource, a computing resource and a storage resource and a current congestion degree of a network such as non-congestion, moderate congestion and serious congestion being carried therein, and the CEP determines whether to initiate a user capability updating request or not according to the condition of the network.

Step 604: the CEP performs right checking on the user according to subscription information of the user, and generates a capability parameter requested by the user to be updated.

Wherein, the subscription information may be network subscription data from a network side, service subscription data from an application side and capability subscription data configured by the CEP. A user right includes whether the user has a right over application for network capability updating, whether the network or an application allows the user to currently perform network capability updating or not and the like.

If the user has the right over application for network capability updating and the network or the application also allows the user to currently perform network capability updating, the CEP may generate the capability parameter requested by the user to be updated.

In the step, generation of the capability parameter requested by the user to be updated includes that: the CEP generates a user capability updating parameter by combining the new QoS parameter of the service server allowed by the user according to a parameter such as a maximum allowed numerical value of the QoS parameter of the user in subscription, a limit of a network congestion level to user capability updating and charging parameter change corresponding to capability updating and a static capability operation pre-configuration policy, and the user capability updating parameter includes a corresponding parameter such as a bandwidth, a delay, charging and a time length.

Step 605: the CEP requests the CSE for user capability updating, a user ID, a business ID, the generated user capability updating parameter and the like being carried in the user capability updating request, the user capability updating parameter including the parameter such as a bandwidth parameter, a delay parameter, a charging policy and a requested time length.

Step 606: the CSE matches the user capability updating parameter according to a current network resource, and if the current network resource meets a user capability updating requirement, initiates a user policy updating request to a PCRF, information of the QoS parameter to be updated, the charging parameter, the application time length, the user ID and the business ID and the like being carried therein.

Preferably, if the CSE finds that a current network condition is insufficient to support a capability updating request of the user, the method further includes that:

the CSE denies the request, and returns a denial cause, such as network resource insufficiency; and the CEP may deny the QoS parameter change request of the user, and may also regenerate a user capability updating parameter, and reinitiates a request to the CSE.

Step 607: after receiving the user policy updating request, the PCRF regenerates a PCC parameter for the user according to the carried related parameter, and downloads it to an MUP.

The MUP matches the new QoS parameter and the charging parameter for a business data channel of the user to ensure a data bandwidth and delay when the user executes the business and greatly improve user experiences. In addition, timing is performed according to the application time length, and when the application time length is reached, an original PCC parameter value is recovered.

Wherein, the application time length is an alternative parameter, and if the application time length parameter is not carried, a new PCC parameter is applied all the time until the user performs updating regulation next time.

Step 608: the CSE returns a message indicating that user capability updating succeeds to the CEP.

Step 609: the CEP sends an QoS updating acknowledgement to the UE to notify the user that the QoS parameter has been updated, parameter such as a new QoS parameter value, a charge and a requested time length being carried in the QoS updating acknowledgement.

If no interface is defined between the user and the CEP, the user may send the QoS updating acknowledgement to the CSE, and the CSE forwards it to the CEP, as shown in Step 609 represented by a dotted arrowhead in FIG. 6.

From the first embodiment, it can be seen that the user implements real-time application of changing the QoS parameter of the business to the CEP to meet a user experience requirement of the user on the business. The CEP may perform user capability updating processing, negotiate about user capability updating with the CSE and the service server and make a user capability updating application to the CSE, so that a network capability required by the user is maximally achieved, a dynamic requirement of the user on the network resource is ensured, and quality of user experiences is improved.

Figure 7:
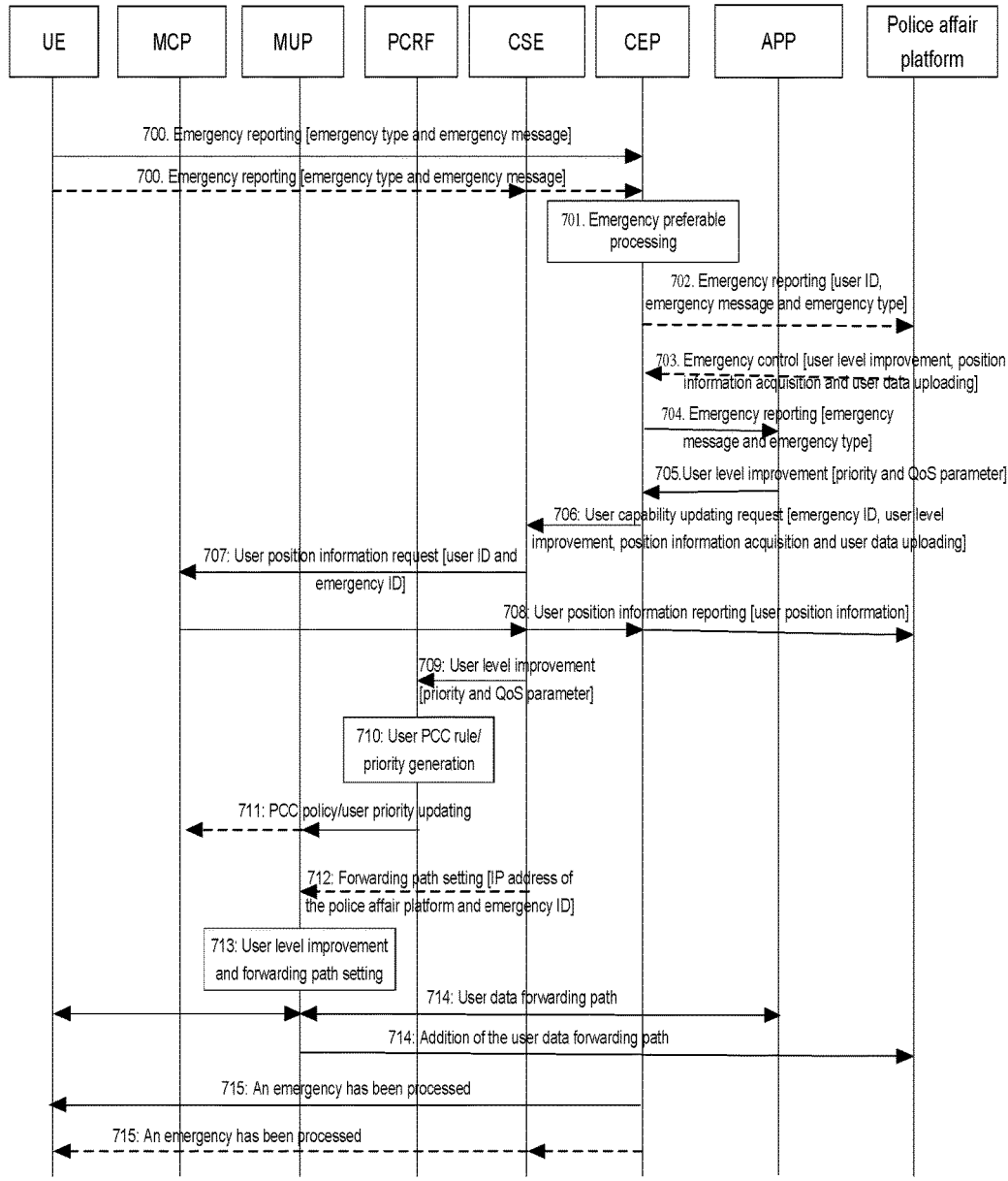
FIG. 7 is a flowchart of a second embodiment of implementing capability exposure according to an embodiment of the present disclosure.

FIG. 7 is a flowchart of a second embodiment of implementing capability exposure according to an embodiment of the present disclosure. As shown in FIG. 7, in the second embodiment, it is supposed that a user wants to improve a user priority, user data transmission and call guarantee in case of an emergency such as a traffic accident on an expressway, an earthquake, loss in exploration and a debris flow disaster. At this moment, the user sends the emergency to a CEP through a user capability interface, including the following steps.

Step 700: a user initiates an emergency reporting message to a CEP through UE, a type of an emergency and a business ID as well as an emergency message of the user being carried therein.

If no interface is defined between the user and the CEP, the user may send the emergency reporting message to a CSE, and the CSE forwards it to the CEP, as shown in Step 700 represented by a dotted arrowhead in FIG. 7.

Step 701: after receiving an emergency notice of the user, the CEP preferably processes an emergency for the user, and the CEP is required to improve a user priority and QoS level of the user according to a level of the emergency.

Step 702: the CEP notifies a corresponding police affair platform or emergency centre of the emergency according to the emergency type, information such as a user ID, the emergency type and the emergency message being carried in the emergency reporting notice.

Wherein, the police affair platform or the emergency centre recognizes an emergency degree of the emergency, and performs corresponding processing, for example, processing of determining a position of the user, improving the priority of the user, applying for a network bandwidth and requesting the user to be online all the time.

Step 703: the police affair platform or the emergency centre initiates an emergency control notice to the CEP, a control parameter of user level improvement, user position information acquisition, real-time user data information uploading and the like being carried therein.

Wherein, user level improvement includes improvement of a business priority and QoS parameter of the user, and a reference value may also be carried, as mentioned in the first embodiment. User position information acquisition includes acquisition of current position information and position information during movement of the user. Real-time user data information uploading includes forwarding of business data of the user to the police affair platform or the emergency centre to ensure that site first-hand data is mastered for real-time processing of the emergency.

Step 704: the CEP searches for a service server which provides service for the user according to the business ID of the user, and notifies the service server of the emergency of the user, and the service server processes the emergency of the user, for example, an operation of improving the business priority of the user according to the emergency type, allocating a business processing resource allocated the user, improving a transmission bandwidth/delay of the user and the like.

Step 705: the service server initiates a user level improvement request to the CEP, wherein user level improvement includes improvement of the business priority and QoS parameter of the user, and the reference value may also be carried, as mentioned in the first embodiment.

Step 706: the CEP integrates the emergency parameters of the police affair platform and the service server and a statically configured emergency parameter to determine whether to apply for an emergency network resource for the user or not, improves the user priority, and generates a corresponding parameter, such as a QoS parameter, a charging parameter and an optimized priority parameter, wherein the statically configured emergency parameter may include a mapping relationship between a type of an emergency and a QoS parameter/user priority.

In the step, the CEP initiates a user capability updating request to the CSE, and an emergency ID, the user ID, the user level improvement parameter, the user position acquisition parameter, the user data uploading parameter and the like are carried in the request message, wherein the user data uploading parameter includes an ID or Internet Protocol (IP) address of the police affair platform or the emergency centre.

Step 707: the CSE recognizes an emergency request, and the CSE initiates a user position information acquisition request to an MCP to request the MCP to acquire a current position of the user and report position information of the user when the position of the user changes according to a requirement.

Step 708: after acquiring the position information of the user, the MCP reports the position information of the user to the CSE, and the CSE reports it to the police affair platform or the emergency centre through the CEP, so that the emergency may be accurately positioned, and emergency processing may be implemented at the first time.

Step 709: the step is executed simultaneously with Step 707. The CSE recognizes the emergency request, and at this moment, if a network resource is insufficient, releases a low-priority business of the user to ensure an emergency resource, and after ensuring that the network resource meets a requirement, the CSE initiates the user level improvement request to a PCRF, the QoS parameter, the charging parameter, the user priority and the like being carried therein, the charging parameter being usually set to be free or still keep a call in case of arrearage according to the emergency type.

Step 710: the PCRF generates a new PCC parameter for the user, including the QoS parameter, the charging policy and the user priority. A user in an emergency is usually a high-priority user.

Step 711: the PCRF transmits the updated PCC parameter and user priority of the user and the emergency ID to an MUP, and the MUP matches the new QoS parameter and charging parameter for a business data channel of the user to ensure a data bandwidth and delay when the user executes the business to ensure timely and efficient processing of the business of the user in emergency.

The PCRF sends the user priority to the MCP, and the MCP still preferably ensures access of the user under the condition that a network control plane resource is insufficient.

Step 712: the step is executed simultaneously with Step 707. The CSE notifies the MUP of setting a forwarding path to forward a data packet of the user according to the user data uploading parameter, the IP address of the police affair platform or the emergency centre being carried in a path setting request.

Step 713: the MUP sends the business data packet of the user to the corresponding service server according to a parameter of the set forwarding path, and meanwhile, forwards the business data packet to the police affair platform or the emergency centre.

Step 714: after setting of the forwarding path of the user is completed, when the business data packet uploaded by the user reaches the MUP, the MUP simultaneously forwards the data packet to the service server and the police affair platform or the emergency centre.

Step 715: the CEP notifies the user of a message indicating that the emergency has been processed through the user capability interface, wherein information such as the updated QoS parameter and the user priority may be carried, and the user may initiate a business of a video, a picture and the like in real time, timely report real-time information of the emergency, so that the emergency may be rapidly and effectively spread and processed, and a user experience requirement of the user on the emergency may be met.

The message indicating that the emergency has been processed in the step may be sent to the user through the newly defined user capability interface, and may also be forwarded to the user via the CSE (Step 715 represented by a dotted line in FIG. 7).

From the second embodiment, it can be seen that the emergency message is reported to the CEP in real time in case of the emergency of the user. The CEP preferably processes the emergency, interacts with the emergency centre and the service server, generates the parameter such as the QoS parameter and the user priority corresponding to the emergency and information such as a user position requirement of a third party on the network according to network capability requirements of the two on the emergency and own configuration parameter, notifies the CSE of the emergency, and makes a request of changing a capability of the user, thereby maximally achieving a network capability required by the user in the emergency, ensuring effective transmission and efficient processing of related services of the user in the emergency and greatly improving quality of user experiences in an emergency scenario.

Figure 8:
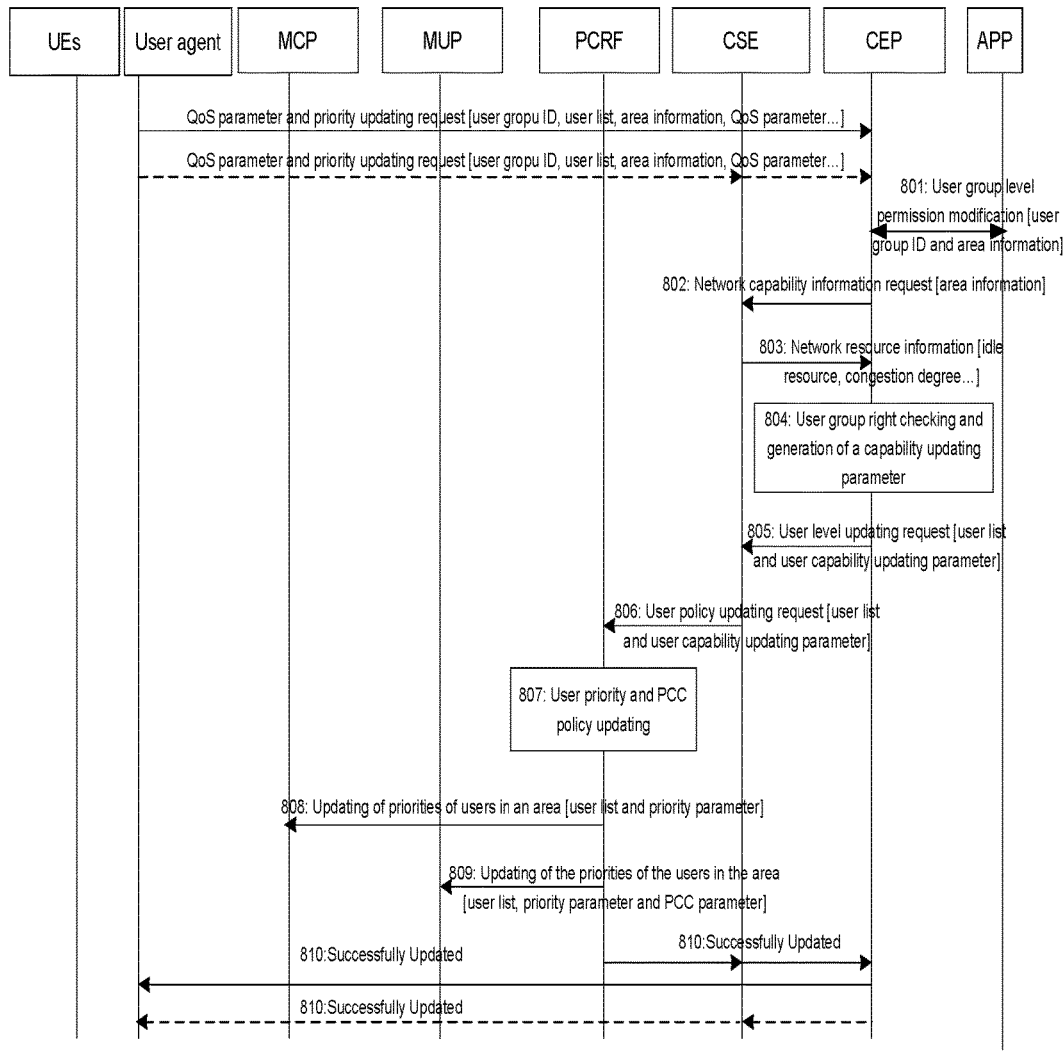
FIG. 8 is a flowchart of a third embodiment of implementing capability exposure according to an embodiment of the present disclosure.

FIG. 8 is a flowchart of a third embodiment of implementing capability exposure according to an embodiment of the present disclosure. As shown in FIG. 8, in the third embodiment, it is supposed that multiple pieces of UE form a UE group, and have a video conference through a mobile network, or multiple users are invited to participate in an auction in an area. In a scenario where multiple users participate in an activity, if requirements of the users on network capabilities greatly grow, at this moment, there may be a setting: a user agent for requests of UE of the multiple users improves the network capabilities of the users participating in the activity to meet the requirements of the multiple users on a specific activity in a centralized manner. At this moment, the user agent may request a CEP to update a network capability through a user capability interface with the CEP, including the following steps.

Step 800: a user agent initiates a QoS parameter and priority updating request of a user group to a CEP through UE, user IDs, a user list, application area information, a business ID with a QoS parameter improvement requirement and a requested time length being carried in the request, a QoS parameter indication required to be improved or an expected parameter value, such as a bandwidth parameter and a delay parameter, being further carried.

If no interface is defined between the user agent and the CEP, the user agent may send the QoS parameter and priority updating request to a CSE, and the CSE forwards it to the CEP, as shown in Step 800 represented by a dotted arrowhead in FIG. 8.

Step 801: after receiving the QoS parameter and priority updating request of the user group, the CEP initiates the QoS parameter and priority updating request to a corresponding service server according to the business ID of the user group therein, and carries a parameter such as the user group ID, the area information, a parameter indication of a QoS parameter and a priority or a reference value.

After receiving the QoS parameter and priority updating request of the user group, the service server determines a new QoS parameter allowed by the user group, such as an allowed data transmission bandwidth and delay parameter, according to a business priority of the user group, a business traffic condition of an area where the user group is positioned, a current processing capability of the service server, a data interface of the service server and a data flow processing congestion degree, and returns it to the CEP.

Step 802: the CEP initiates a network capability information request to the CSE, information of the area where the user group is positioned being carried therein.

In the step, if the users in the user group are positioned in different networks of an operating companies or networks of different operating companies, the method further includes that: the CEP acquires CSEs to which the users belong from a network side, for example, acquiring network information of the users from a Home Subscriber Server (HSS), and then initiate network capability information requests to the CSEs where different users are positioned.

Step 803: the CSE checks a network resource, and generates and returns a report to the CEP, the report including an idle condition of the network resource such as a bearer resource, a computing resource and a storage resource, a current congestion degree of a network such as non-congestion, moderate congestion and serious congestion and information such as access capabilities of the users in the area, and the CEP determines whether to initiate a user group capability updating request or not according to the current condition of the network.

When the CEP processes the user group change request when the users are positioned in different networks, if requirements of some individual users may not be met, the CEP should notify the user agent, and the user agent determines whether to continue executing the request or not.

Step 804: the CEP performs right checking on the user group according to subscription information of the user group, and generates a capability parameter requested by the user group to be updated.

Wherein, the subscription information may be network subscription data from the network side, service subscription data from an application side and capability subscription data configured by the CEP. A user group right includes whether the user agent has a right over application for network capability updating, whether the network or an application allows the user group to currently perform network capability updating or not and the like.

If the user agent has the right over application for network capability updating and the network or the application also allows the user group to currently perform network capability updating, the CEP may generate the capability parameter requested by the user group to be updated.

In the step, generation of the capability parameter requested by the user group to be updated includes that: the CEP generates a updated capability parameter of the user group by combining the new QoS parameter and priority parameter of the service server allowed by the user according to a parameter such as a maximum allowed numerical value of the QoS parameter of the user group in subscription, a limit of a network congestion level to user group capability updating and charging parameter change corresponding to capability updating, and the capability parameter includes a corresponding parameter such as a bandwidth, a delay, charging, a time length and a user priority.

Step 805: the CEP requests the CSE for user capability updating, a user ID list, the business ID, the user capability updating parameter and the like being carried therein, the user capability updating parameter including the parameter such as a bandwidth parameter, a delay parameter, a charging policy, a requested time length and the user priority.

Wherein, the CEP generates the user ID list according to a mapping table between a user group ID and a user ID and users actually in the user group in the area, and carries it in the request message.

If the users in the user group belong to different CSEs of different networks, the method further includes that: the CEP is required to initiate user capability updating requests to the CSEs to which all the users in the user group are positioned, user IDs of the networks being carried in the requests.

Step 806: the CSE matches the user capability updating parameter according to a current network resource, and if the current network resource meets a user capability updating requirement, initiates a user policy updating request to a PCRF, the user capability updating parameter being carried therein, including information of the QoS parameter to be updated, the charging parameter, the application time length, the user ID, the business ID, the user priority and the like.

Preferably, if the CSE finds that a current network condition is insufficient to support a capability updating request of the user group, the method further includes that:

the CSE denies the request, and returns a denial cause, such as network resource insufficiency; and the CEP may deny the QoS parameter and priority change request of the user group, and may also regenerate a user capability updating parameter, and reinitiates a request to the CSE.

Step 807: after receiving the user policy updating request, the PCRF regenerates a corresponding PCC parameter and priority parameter for the users in the user list according to the carried user list and the related QoS parameter and priority parameter.

Step 808: the PCRF transmits the priority parameter corresponding to the users to an MCP, and the MCP ensures that a high-priority user preferably accesses the network when the network access resource is insufficient.

Step 809: the PCRF transmits the PCC parameter and priority parameter corresponding to the users to an MUP, and the MUP matches the new QoS parameter and the charging parameter for a business data channel of the user to ensure a data bandwidth and delay when the user executes the business and greatly improve user experiences. In addition, timing is performed according to the application time length, and in case of time length timing overflow, an original PCC parameter value is recovered.

Wherein, the application time length is an alternative parameter, and if the application time length parameter is not carried, a new PCC parameter is applied all the time until the user performs updating regulation next time.

Step 810: the CSE returns a message indicating that user capability updating has succeeded to the CEP.

Step 811: the CEP notifies the user agent that the QoS parameter and the priority have been updated, and may carry a parameter such as an updated QoS parameter value, a charge, a requested time length and the priority for notification to the user agent, and the user agent may notify the users of performing the related business, so that quality of user experiences is improved.

The notice message may be sent to the users through newly defined user capability interface, and if there is no such interface, may also be forwarded to the users via the CSE (Step 811 represented by a dotted line in FIG. 8).

From the third embodiment, it can be seen that the network architecture for implementing capability exposure in the present disclosure not only implements capability updating of a single user, but also implements capability updating of the user group including the multiple users through the user agent. Not only are requirements of the multiple users participating in the same activities on network capabilities met, but also smooth development of the activities of the user group is ensured, so that user experiences are met. Meanwhile, capability updating initiation of a single user is avoided, a conflict of signalling processing capabilities of the CEP is prevented, and a probability that network resource parameters applied when the multiple users apply may not meet practical requirements is also avoided. The network capabilities required by the user group are maximally achieved, dynamic requirements of the user group on the network resources and smooth development of the activity of the user group are ensured, and quality of user experiences is improved.

INDUSTRIAL APPLICABILITY

According to the embodiments of the present disclosure, the network capability is updated according to the request from the user, exposure of the network capability in the capability exposure network to the user is implemented, and the user is ensured to smoothly use the service, so that quality of user experiences is improved.

What is claimed is:

1. A system for implementing capability exposure, comprising a processor and memory: a Mobility Control Plane Entity (MCP), a Mobility User Plane Entity (MUP), a Policy and Charging Rule Function (PCRF), an Application Server (APP), a Capability Schedule Entity (CSE) and a Capability Exposure Platform (CEP), wherein the CEP is configured to receive a user capability updating service request from User Equipment (UE) via a user capability interface of the CEP, or, receive the user capability updating service request from the UE via the CSE; and the CEP is further configured to provide network capability updating service for the UE;

the CEP is configured to receive the user capability updating service request for updating a network capability from the UE, determine whether to initiate the network capability updating service for a user according to subscription information of the user and current network capability information, generate a corresponding user capability updating parameter after determining to initiate the network capability updating service for the user, and send the CSE a user capability updating request, in which the generated user capability updating parameter being carried;

the CSE is further configured to schedule a network resource to meet a network capability requirement of the user according to the obtained user capability updating parameter, and return an acknowledgement response to the CEP when the current network resource meets the capability updating requirement of the user; and the PCRF is configured to update a Policy Control and Charging (PCC) and user priority of the user according to the user capability updating parameter, and transmit them to the MCP and the MUP for execution.

2. The system according to claim 1, wherein the CEP is further configured to return a user capability updating success notice to the UE, or return the user capability updating success notice to the UE via the CSE.

3. The system according to claim 1, wherein the CSE is further configured to return a denial response to the CEP when the current network resource cannot meet the capability updating requirement of the user, and a denial cause being carried in the denial response.

4. The system according to claim 3, wherein the CEP is further configured to return a update denial response to the UE, or regenerate a user capability updating parameter and reinitiate a user capability updating request, in which the regenerated user capability updating parameter being carried, to the CSE.

5. The system according to claim 1, wherein the UE is a UE comprising a single user, or is a UE group comprising two or more than two users.

6. A method for implementing capability exposure with a processor and a memory, the method comprising:

acquiring, by a Capability Exposure Platform (CEP), a user capability updating service request of User Equipment (UE), and determining whether to initiate network capability updating service for a user according to subscription information of the user and current network capability information;

wherein the CEP is configured to receive a user capability updating service request from the User Equipment via a user capability interface of the CEP, or receive the user capability updating service request from the UE via the CSE;

generating a corresponding user capability according to the subscription information and the current network capability information;

updating parameter after determining to initiate the network capability updating service for the user; and sending a user capability updating request, in which the generated user capability updating parameter being carried, to a Capability Schedule Entity (CSE), to cause the CSE to schedule a network resource to meet a network capability requirement of the user according to the user capability updating parameter.

7. The method according to claim 6, wherein the user capability updating service request carries a user Identity (ID) or a user group ID and a business ID of service requested to be updated.

8. The method according to claim 7, wherein the user capability updating service request further carries a parameter of the service requested to be updated,
or a type of an emergency and an emergency message of the user,
or a user list in a user group and application area information.

9. The method according to claim 6, wherein a basis for determining the network capability updating service for the user comprises:
the subscription information of the user indicates a right over network capability updating and the current network capability information indicates that the current network resource meets the network capability updating requirement of the request.

10. The method according to claim 9, wherein the current network capability information is current network capability information, obtained from the CSE, of a network; and
the subscription information of the user comprises network subscription information, obtained from a network side, of the user, and/or service subscription information, obtained from an application side, of the user, and/or capability subscription information, configure by the CEP, of the user.

11. The method according to claim 6, wherein generating the user capability updating parameter comprises: generating, by the CEP, an to be updated Quality of Service (QoS) parameter or user priority parameter according to a user QoS parameter or priority parameter obtained from a service server and allowed by a service, and/or current network resource information and network congestion degree information obtained from the network side and/or user capability subscription information configured by the CEP, and generating the user capability updating parameter according to a preset configuration policy; and
the user capability updating parameter comprises one or more of: a QoS parameter, or a user priority, or a bandwidth parameter, or a delay parameter, or a charging policy, a requested time length.

12. The method according to claim 6, wherein scheduling the network resource to meet the network capability requirement of the user according to the user capability updating parameter comprises:
matching, by the CSE, the user capability updating parameter according to the current network resource, and if the current network resource meets a requirement presented by the user capability updating parameter, initiating a user policy updating request to a Policy and Charging Rule Function (PCRF), parameter information of the service requested to be updated being carried in the request.

13. The method according to claim 12, further comprising: updating, by the PCRF, a Policy and Charging Control (PCC) and user priority of the user according to the user capability updating parameter, and transmitting the PCC and user priority to a Mobility Control Plane Entity (MCP) and a Mobility User Plane Entity (MUP) for execution.

14. The method according to claim 12, further comprising: when the current network resource is insufficient, regenerating, by the CEP, a user capability updating parameter; and
scheduling, by the CSE, a network resource to meet the network capability requirement of the user according to the regenerated user capability updating parameter.

15. A Capability Exposure Platform (CEP), comprising a memory, a receiver, a processor and a transmitter, wherein
the receiver is configured to receive a user capability updating service request, determine whether to initiate network capability updating service for a user according to subscription information of the user and current network capability information from an acquisition device, and notify the processor when determining to initiate the network capability updating service;
the processor is configured to receive the notice from the receiver, generate a corresponding user capability updating parameter according to the subscription information of the user and service and network resource parameters from the acquisition device, and output the generated user capability updating parameter to the transmitter;
the acquisition device is configured to acquire the subscription information of the user and the service and network resource parameters; and
the transmitter is configured to send a user capability updating request to a Capability Schedule Entity (CSE), the generated user capability updating parameter being carried in the request, wherein the receiver, the acquisition device, the processor and the transmitter include hardware components executing program instructions.

16. The CEP according to claim 15, wherein transmitter is further configured to:
when an acknowledgement response is received from the CSE through the receiver, send an update success response to User Equipment (UE); and
when a denial response is received from the CSE through the receiver, send an update denial response to the UE, or send a reprocessing notice to the processor.

17. The CEP according to claim 16, wherein the processor is further configured to receive the reprocessing notice, regenerate a user capability updating parameter, and reinitiate a user capability updating request to the CSE through the transmitter, the regenerated user capability updating parameter being carried the reinitiated request.

18. A non-transitory computer-readable storage medium, storing a computer-executable instruction, the computer-executable instruction being configured to execute the method as claimed in claim 6.

* * * * *